United States Patent
Nashizawa et al.

(10) Patent No.: US 9,646,397 B2
(45) Date of Patent: May 9, 2017

(54) IMAGE PROCESSING APPARATUS AND IMAGE PROCESSING METHOD

(71) Applicant: CANON KABUSHIKI KAISHA, Tokyo (JP)

(72) Inventors: Hiroaki Nashizawa, Tokyo (JP); Yuka Minegishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/981,284

(22) PCT Filed: Mar. 19, 2013

(86) PCT No.: PCT/JP2013/001855
§ 371 (c)(1),
(2) Date: Oct. 10, 2014

(87) PCT Pub. No.: WO2013/157201
PCT Pub. Date: Oct. 24, 2013

(65) Prior Publication Data
US 2015/0036878 A1 Feb. 5, 2015

(30) Foreign Application Priority Data

Apr. 19, 2012 (JP) .................... 2012-096039
Sep. 14, 2012 (JP) .................... 2012-203544

(51) Int. Cl.
*G06K 9/00* (2006.01)
*G06T 11/60* (2006.01)
(Continued)

(52) U.S. Cl.
CPC .......... *G06T 11/60* (2013.01); *G06K 9/00624* (2013.01); *G06T 3/00* (2013.01);
(Continued)

(58) Field of Classification Search
CPC ....... G06K 9/00624; G06T 11/60; G06T 3/00; G06T 5/50; G06T 2200/21;
(Continued)

(56) References Cited

U.S. PATENT DOCUMENTS

| 7,349,119 B2 | 3/2008 | Tsukioka |
| 2002/0154829 A1* | 10/2002 | Tsukioka ............. G06T 5/009 382/254 |

(Continued)

FOREIGN PATENT DOCUMENTS

| CN | 1685710 A | 10/2005 |
| CN | 101557468 A | 10/2009 |

(Continued)

OTHER PUBLICATIONS

International Search Report of the corresponding International Application, PCT/JP2013/001855 dated Apr. 16, 2013.

(Continued)

*Primary Examiner* — Amara Abdi
(74) *Attorney, Agent, or Firm* — Cowan, Liebowitz & Latman, P.C.

(57) ABSTRACT

An image processing apparatus which composes a plurality of images captured while changing an exposure amount, includes a displacement detection unit which detects a displacement amount between the plurality of images, a correction unit which corrects a displacement between the images based on the displacement amount detected by the displacement detection unit, a moving object region detection unit which detects a moving object region from the plurality of images for which the displacement has been corrected, an image composition unit which composes the plurality of images for which the displacement has been corrected, and a moving object processing unit which replaces a region corresponding to the moving object region (Continued)

of the composite image composed by the image composition unit by an image obtained by performing weighted addition of the plurality of images.

31 Claims, 15 Drawing Sheets

(51) Int. Cl.
*H04N 5/232* (2006.01)
*H04N 5/235* (2006.01)
*G06T 5/50* (2006.01)
*G06T 3/00* (2006.01)

(52) U.S. Cl.
CPC ............. *G06T 5/50* (2013.01); *H04N 5/2355* (2013.01); *H04N 5/2356* (2013.01); *H04N 5/23232* (2013.01); *G06T 2200/21* (2013.01); *G06T 2207/10016* (2013.01); *G06T 2207/20208* (2013.01); *G06T 2207/20221* (2013.01); *G06T 2207/30196* (2013.01)

(58) Field of Classification Search
CPC . G06T 2207/10016; G06T 2207/20208; G06T 2207/20221; G06T 2207/30196; H04N 5/23232; H04N 5/2355; H04N 5/2356
See application file for complete search history.

(56) References Cited

U.S. PATENT DOCUMENTS

| | | | | |
|---|---|---|---|---|
| 2006/0033823 A1* | 2/2006 | Okamura | ............. | H04N 5/2355 348/254 |
| 2007/0242936 A1* | 10/2007 | Chujo | ................... | G03B 17/00 396/55 |
| 2008/0187234 A1* | 8/2008 | Watanabe | ............ | H04N 1/3876 382/254 |
| 2010/0157073 A1* | 6/2010 | Kondo | ............... | H04N 5/23248 348/208.4 |
| 2010/0321510 A1* | 12/2010 | Tsutsumi | ................ | G06T 5/003 348/208.4 |
| 2011/0205380 A1* | 8/2011 | Shirakawa | ............. | H04N 5/247 348/211.9 |
| 2012/0038793 A1* | 2/2012 | Shimizu | ................. | H04N 5/145 348/231.99 |
| 2014/0055639 A1* | 2/2014 | Fujimoto | ............. | H04N 5/2353 348/229.1 |

FOREIGN PATENT DOCUMENTS

| | | | | | |
|---|---|---|---|---|---|
| JP | 06-141229 | | * | 5/1994 | ............ H04N 5/235 |
| JP | 2002-271686 | A | | 9/2002 | |
| JP | 2003-009006 | | * | 1/2003 | ............ H04N 5/335 |
| JP | 2003-009006 | A | | 1/2003 | |
| JP | 2005-141614 | A | | 6/2005 | |
| JP | 4282113 | B | | 6/2009 | |
| JP | 2009-218893 | A | | 9/2009 | |
| JP | 2009-253690 | A | | 10/2009 | |
| JP | 4553942 | B | | 9/2010 | |
| JP | 2011-004190 | A | | 1/2011 | |
| WO | 2007/032156 | A1 | | 3/2007 | |

OTHER PUBLICATIONS

Feb. 2, 2016 Chinese Office Action, with an English Translation, that issued in Chinese Patent Application No. 201380000647.8.

* cited by examiner

POSITION REFERENCE IMAGE

| 10 | 50 | 60 | 70 |
|----|----|----|----|
| 30 | 70 | 60 | 80 |
| 40 | 50 | 70 | 90 |
| 50 | 60 | 60 | 70 |

↓—X→
Y↓

DISPLACEMENT DETECTION IMAGE

| 30 | 30 | 70 | 40 | 50 | 50 | 60 | 70 |
|----|----|----|----|----|----|----|----|
| 30 | 40 | 80 | 50 | 60 | 60 | 60 | 80 |
| 20 | 10 | 50 | 60 | 70 | 80 | 30 | 70 |
| 80 | 30 | 70 | 60 | 80 | 90 | 40 | 50 |
| 90 | 40 | 50 | 70 | 90 | 50 | 60 | 70 |
| 70 | 50 | 60 | 60 | 70 | 70 | 60 | 80 |
| 60 | 70 | 80 | 30 | 70 | 50 | 60 | 70 |
| 50 | 60 | 60 | 60 | 80 | 80 | 30 | 70 |

↓—X→
Y↓

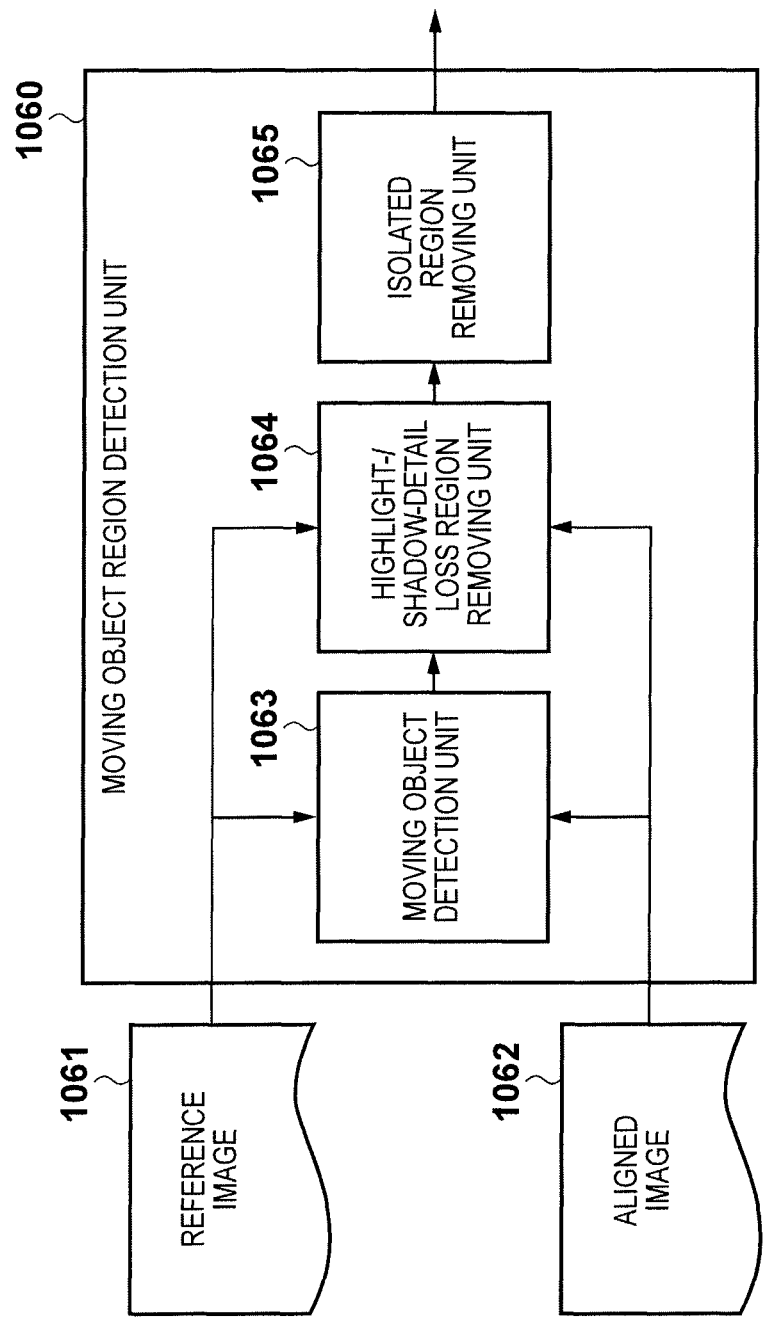

FRONT-CURTAIN SYNC MODE

REAR-CURTAIN SYNC MODE

MULTIPLE FLASH MODE A

MULTIPLE FLASH MODE B

BLUR REDUCTION

FIG. 13

HDR DETAILED SETTING

ALIGNMENT PROCESSING ON OFF

MOVING OBJECT PROCESSING ON OFF

MOVING OBJECT REPRESENTATION METHOD FRONT-CURTAIN SYNC MODE

REAR-CURTAIN SYNC MODE

MULTIPLE FLASH MODE A

MULTIPLE FLASH MODE B

BLUR REDUCTION

IMAGE PROCESSING APPARATUS AND IMAGE PROCESSING METHOD

BACKGROUND OF THE INVENTION

Field of the Invention

The present invention relates to a technique of generating an image having a wide dynamic range by composing a plurality of images shot while changing an exposure amount.

Description of the Related Art

There is conventionally known a method of generating an image having a wide dynamic range by shooting a plurality of images with few highlight-detail losses and few shadow-detail losses while changing an exposure condition, and composing the images. This is called high dynamic range (HDR) composition. Since the HDR composition processing causes a time lag in shooting between the plurality of images, it is considered to be unsuitable for shooting of a moving object. This processing generates a composite image in which the luminance varies depending on the position of the moving object and which therefore looks very unnatural.

Methods for solving such problem have been described in Japanese Patent Nos. 4282113 and 4553942.

In Japanese Patent No. 4282113, a plurality of images shot at different exposure amounts are compared to calculate a motion vector. If the magnitude of the calculated motion vector is larger than a predetermined threshold, it is determined to include an incorrectly composed portion. The pixel signals of the incorrectly composed portion are corrected based on the pixel signals of a portion other than the incorrectly composed portion.

Japanese Patent No. 4553942 describes a method of detecting and correcting a displacement between a plurality of images shot at different exposure amounts, evaluating the similarity of each portion between the images after the displacement correction processing, and changing an image composition method based on the evaluation of the similarity. This method can generate an image including a small amount of displacement due to the movement of a camera and a small amount of blur of an object due to the movement of the object. According to Japanese Patent No. 4553942, whether to compose images is determined based on the similarity, and thus it is possible to generate an image including a small amount of blur of an object while reducing the processing load.

Japanese Patent Nos. 4282113 and 4553942 basically describe processing of replacing the region of a moving object by one other image, and aim to obtain a natural image which has a uniform luminance regardless of the position of the moving object. However, these methods assume that the region of the moving object has been correctly extracted without any error.

SUMMARY OF INVENTION

The present invention has been made in consideration of the aforementioned problem, and realizes high dynamic range composition processing capable of generating, even for a moving object, a natural image which gives no unnatural impression.

To solve the aforementioned problem, the present invention provides an image processing apparatus which composes a plurality of images captured while changing an exposure amount, comprising: a displacement detection unit configured to detect a displacement amount between the plurality of images; a correction unit configured to correct a displacement between the images based on the displacement amount detected by the displacement detection unit; a moving object region detection unit configured to detect a moving object region from the plurality of images for which the displacement has been corrected; an image composition unit configured to compose the plurality of images for which the displacement has been corrected; and a moving object processing unit configured to replace a region corresponding to the moving object region of the composite image composed by the image composition unit by an image obtained by performing weighted addition of the plurality of images.

Furthermore, the present invention provides an image processing method of composing a plurality of images captured while changing an exposure amount, comprising: a displacement detection step of detecting a displacement amount between the plurality of images; a correction step of correcting a displacement between the images based on the displacement amount detected in the displacement detection step; a moving object region detection step of detecting a moving object region from the plurality of images for which the displacement has been corrected; an image composition step of composing the plurality of images for which the displacement has been corrected; and a moving object processing step of replacing a region corresponding to the moving object region of the composite image composed in the image composing step by an image obtained by performing weighted addition of the plurality of images.

According to the present invention, it is possible to generate, even for a moving object, a natural image which gives no unnatural impression.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a block diagram showing the configuration of a moving object region detection unit according to the embodiment.

FIG. 13 is a view exemplifying a moving object representation method selection screen according to the third embodiment.

DESCRIPTION OF THE EMBODIMENTS

Modes for carrying out the present invention will be described in detail below. Note that embodiments to be described hereinafter are examples required to implement the present invention and should be modified or changed as needed depending on the configurations of apparatus and various conditions to which the present invention is applied, and the present invention is not limited to the following embodiments. Some of embodiments to be described below may be combined as needed.

First Embodiment

An embodiment in which an image processing apparatus according to the present invention is applied to, for example, an image capturing apparatus such as a digital camera for shooting an image will be described. Note that since the present invention is applicable to an image which has been shot via a photographing lens and is formed by a plurality of color planes, a target image of the present invention is not limited to RAW data, JPEG data after development processing, or the like.

<Apparatus Configuration>

Figure 2:
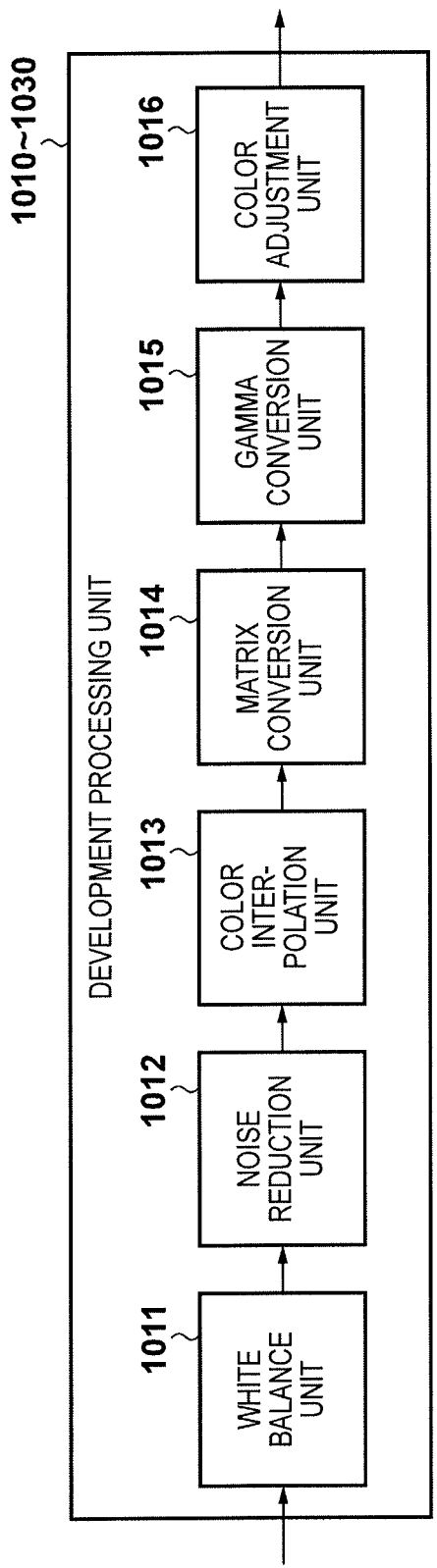
FIG. 2 is a block diagram showing the configuration of a development processing unit according to the embodiment.
Figure 3:
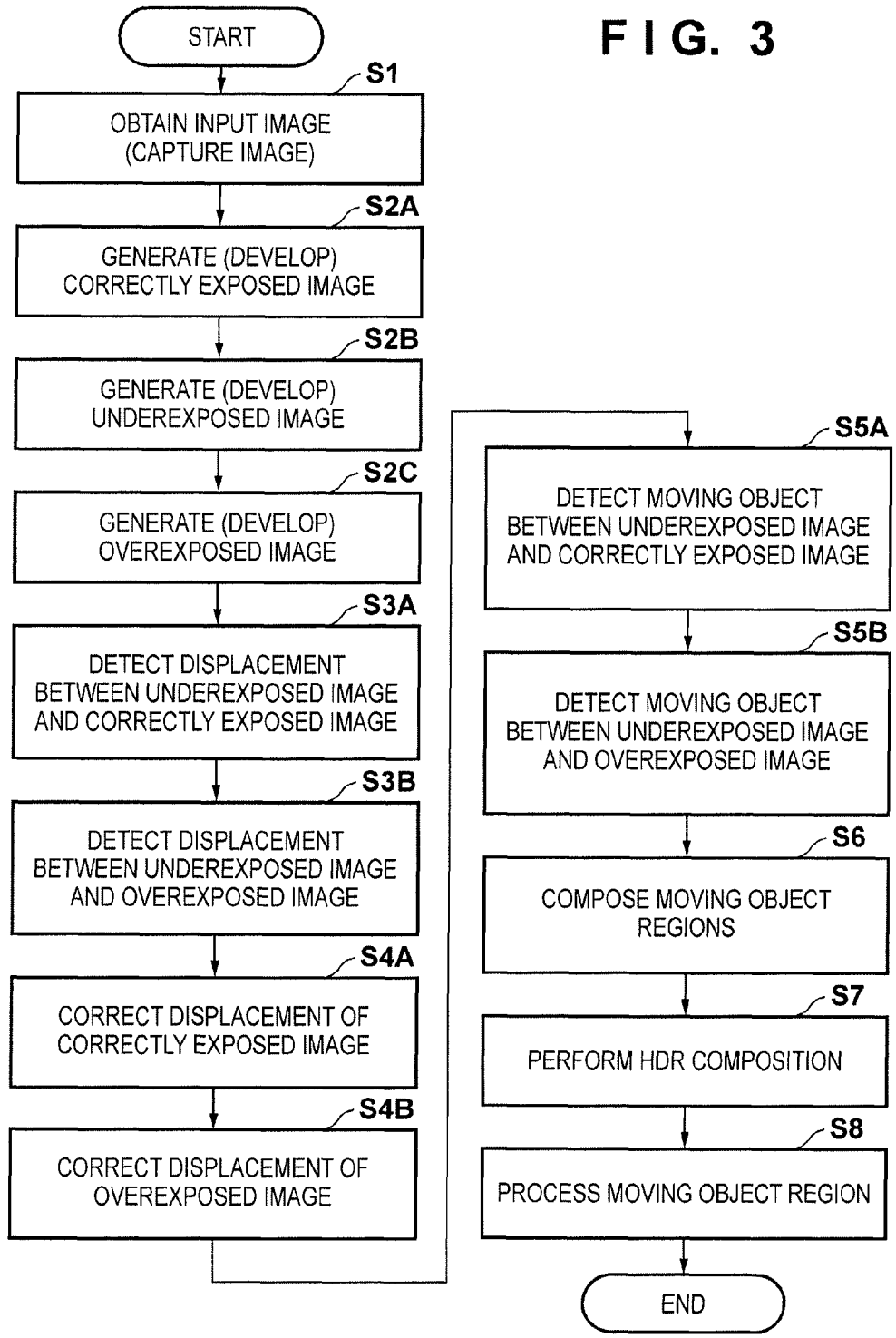
FIG. 3 is a flowchart illustrating HDR composition processing according to the embodiment.

An overview of the configurations and functions of an image capturing apparatus according to the embodiment of the present invention will be described with reference to FIGS. 1 to 3.

Figure 1:
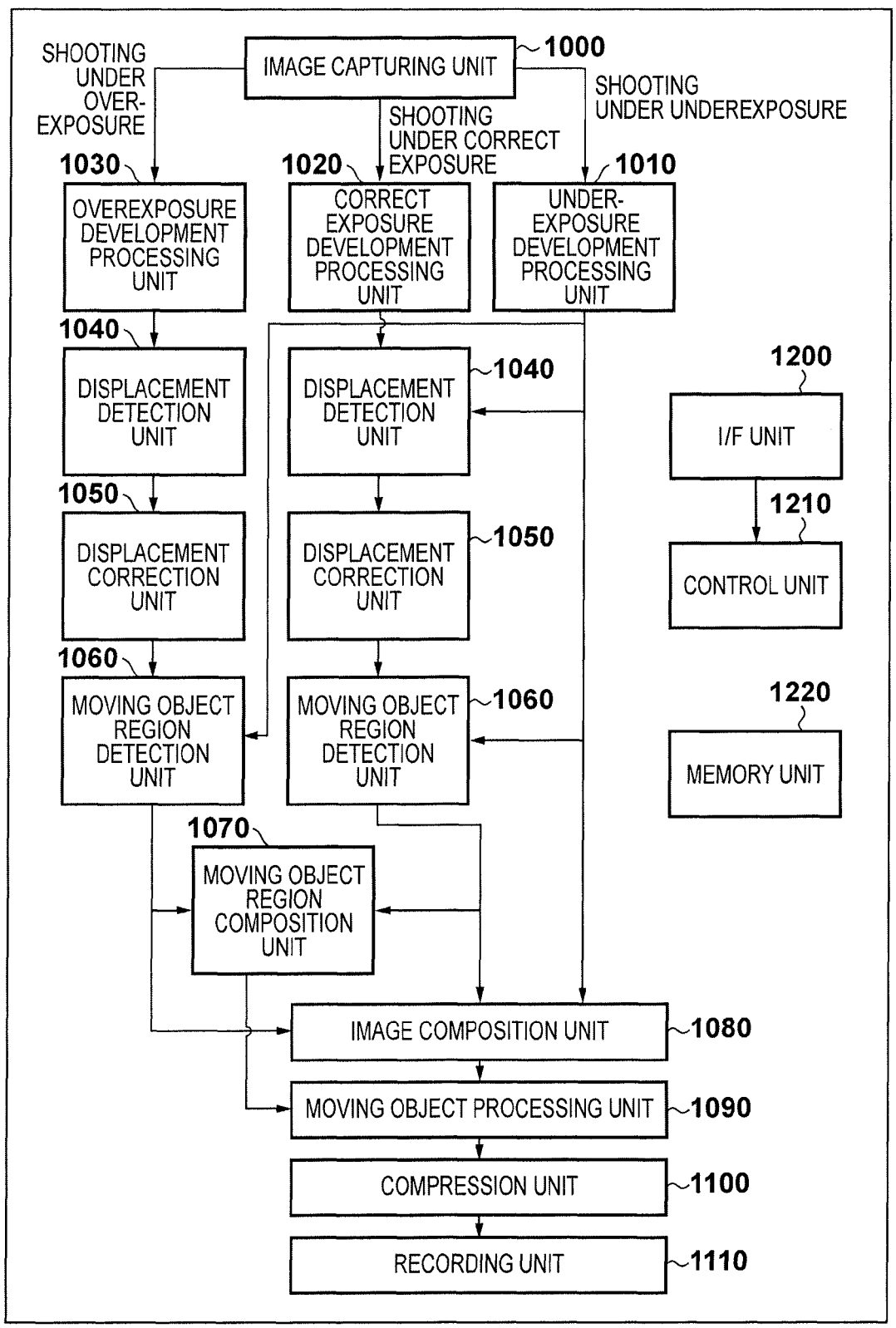
FIG. 1 is a block diagram showing the configuration of an image capturing apparatus according to an embodiment of the present invention.

Referring to FIG. 1, reference numeral 1210 denotes a control unit for controlling the whole image capturing apparatus. The control unit 1210 controls each unit (to be described later), and executes HDR composition processing according to settings and an operation by the user. Reference numeral 1200 denotes an I/F (interface) unit for accepting a user operation and external input; and 1220, a memory unit for holding programs, parameters, and processing target image data associated with HDR composition processing (to be described later). The HDR composition processing to be described later with reference to FIG. 3 is implemented when the control unit 1210 expands, on the work area of the RAM or the like, a program stored in the memory unit 1220, and executes it.

An image capturing unit 1000 forms, on an image sensor, an object image incident through an imaging optical system (lens), and photographically converts it, thereby converting an analog signal output from the image sensor into digital data suitable for image processing (to be described later) (step S1). Assume that the image sensor is, for example, a single board color image sensor which includes a general primary color filter and is formed from a CMOS and the like. The primary color filter includes three types of color filters: R (Red), G (Green), and B (Blue) filters respectively having main pass bands around 650 nm, 550 nm, and 450 nm, and shoots color planes corresponding to respective bands of R, G, and B. In the single board color image sensor, it is possible to only spatially array these color filters for respective pixels, and obtain the intensity on each color plane in each pixel. Therefore, the image sensor outputs a color mosaic image. An A/D conversion unit converts the color mosaic image output as an analog signal from the image sensor into digital image data suitable for image processing.

An underexposure development processing unit 1010, a correct exposure development processing unit 1020, and an overexposure development processing unit 1030 receive different input signals, and thus need to optimize parameters and the like, but the basic processing is the same (steps S2A to S2C).

A white balance unit 1011 performs white balance processing. More specifically, each of R, G, and B signals is multiplied by a gain so as to equalize the signal values for a region which should be white. A noise reduction unit 1012 reduces noise caused by not the object image of input image data but the sensor. A color interpolation unit 1013 generates a color image including color information of R, G, and B in all the pixels by performing interpolation for the color mosaic image. Based on the generated color image, a matrix conversion unit 1014 and gamma conversion unit 1015 generate a basic color image. After that, a color adjustment unit 1016 executes processing of improving the appearance of the color image. For example, the color adjustment unit 1016 performs image corrections such as chroma enhancement, hue correction, and edge enhancement.

To perform high dynamic range (HDR) composition, it is necessary to multiply a gain and equalize luminance levels in advance because a signal around the correct exposure value of each image shot at a different exposure amount is used. The gain needs to be set to prevent a highlight- or shadow-detail loss. Therefore, correction is performed using gamma values shown in FIG. 4, instead of a uniform gain.

Figure 4:
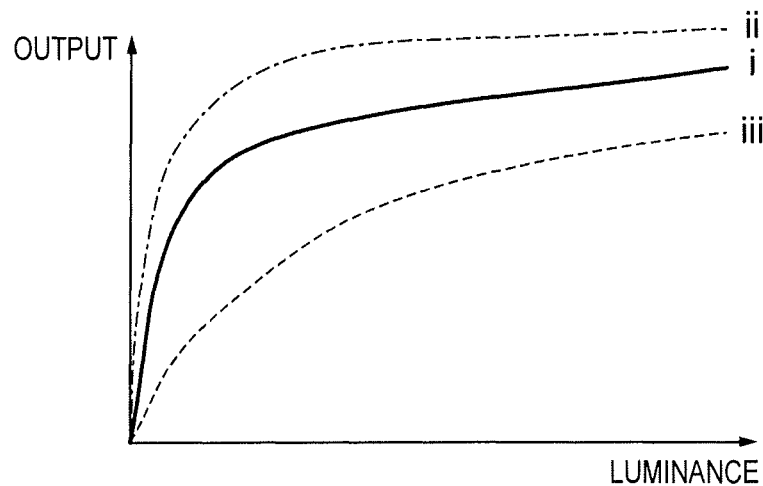
FIG. 4 is a graph exemplifying a gamma characteristic.

In FIG. 4, a solid line (i) indicates a gamma value for a correctly exposed image, a one-dot dashed line (ii) indicates a gamma value for an underexposed image, and a dotted line (iii) indicates a gamma value for an overexposed image. The gamma conversion unit 1015 performs gamma correction using these gamma values. The gamma values are set so as to obtain the same gamma characteristic when each image is multiplied by a gain calculated based on an exposure amount ratio. For example, for a shooting exposure difference of ±3 EV, an underexposed image is multiplied by a gain of 8× and an overexposed image is multiplied by a gain of ⅛×. This processing can smooth the boundaries between a plurality of images when switching between the images according to a luminance region later. As is apparent from the gamma characteristic shown in FIG. 4, an underexposed image is multiplied by a gain larger than that of a correctly exposed image and, therefore, noise may increase in the underexposed image after development processing. On the other hand, since an overexposed image is multiplied by a gain smaller than that of the correctly exposed image, and thus the overexposed image after development processing is expected to have reduced noise, noise reduction processing stronger than necessary is not preferable. To perform appropriate noise reduction processing according to an input image, the noise reduction unit 1012 switches the strength of the noise reduction processing for each image. As a practical method for the noise reduction processing, there are a general method such as smoothing processing using an appropriate kernel size and a method using a filter such as an E filter or edge-preserving type bilateral filter. In this embodiment, it is only necessary to apply an appropriate method as needed in consideration of a balance with resources such as the processing speed of a system and a memory capacity.

In response to an instruction from the control unit 1210, a displacement detection unit 1040 detects a displacement between the correctly exposed image and underexposed image having undergone the development processing, and also detects a displacement between the underexposed image and the overexposed image (steps S3A and S3B). In this example, each image is divided into a plurality of block regions, and then edge detection processing is performed for each block (step S41 in FIG. 5). As an edge detection method, an input image undergoes lowpass filter processing to create a largely blurred image, and an edge is detected by subtracting the largely blurred image from the input image. Alternatively, a method using a well-known differentiation filter or prewitt filter may be used. In edge detection, it is possible to improve the displacement detection accuracy by detecting only the edge of an object image rather than noise attributed to the sensor.

Figure 5:
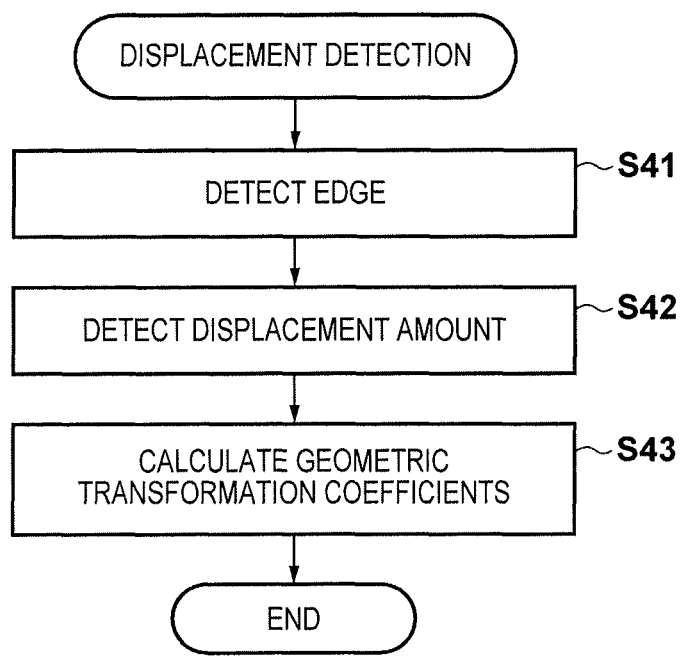
FIG. 5 is a flowchart illustrating displacement detection processing shown in FIG. 3.
Figure 6A:
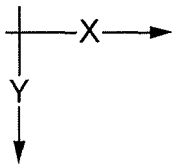
FIG. 6A is a view exemplifying a reference image in the displacement detection processing.
Figure 6B:
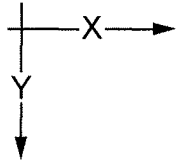
FIG. 6B is a view exemplifying a displacement detection image in the displacement detection processing.

The displacement detection unit 1040 detects a displacement amount for a block region, among the block regions of the image, where the edge could be detected (step S42 in FIG. 5). By detecting a displacement amount for only a block region where the edge could be detected, it is possible to improve the displacement detection accuracy. As a displacement amount detection method, SAD (Sum of Absolute Difference) between the pixel values (luminance values) of a position reference image for all the pixels of the block region and those of a displacement detection image is calculated, and a movement amount and movement direction such that SAD becomes smallest are set as a motion vector for the block. FIGS. 6A and 6B exemplify a displacement detection method. FIG. 6A shows the pixel values of a target block region of the position reference image.

On the other hand, FIG. 6B shows the pixel values of the displacement detection image. In the example shown in FIGS. 6A and 6B, a movement amount which minimizes the absolute value of the difference between the pixel values is (x, y)=(1, 2). The same processing is performed for all the block regions of the image, thereby obtaining the motion vectors of all the block regions. In displacement amount detection, it is possible to improve the displacement detection accuracy more when an object region of the position reference image and a corresponding object region of the displacement detection image have the same brightness.

Lastly, the displacement detection unit 1040 calculates geometric transformation coefficients (step S43 in FIG. 5). Affine coefficients are used as geometric transformation coefficients. The affine coefficients are arranged in a matrix for affine transformation that combines linear transformation and translation, and are given by equation (1).

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad (1)$$

where (x, y) are the coordinates in a pre-correction image, and (x', y') are the coordinates in a post correction image. A 3×3 matrix represents affine coefficients. The affine coefficients are obtained using the obtained motion vectors of the respective block regions.

The displacement detection method in the displacement detection unit 1040 has been described. The present invention, however, is not limited to this. As a displacement detection method, there are various methods such as a method of detecting the displacement between two images by frequency analysis. Any method suitable for a digital camera in terms of the displacement detection accuracy, detection processing load, processing speed, and the like is applicable.

Referring back to FIG. 3, a displacement correction unit 1050 corrects (performs affine transformation for) the correctly exposed image and overexposed image based on the affine coefficients calculated in the aforementioned displacement detection processing (steps S4A and S4B).

Figure 8A:
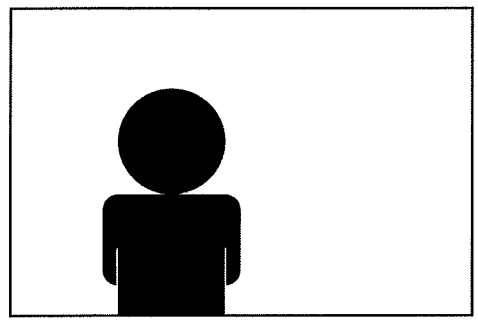
FIG. 8A is a view exemplifying a moving object region detection result.
Figure 8B:
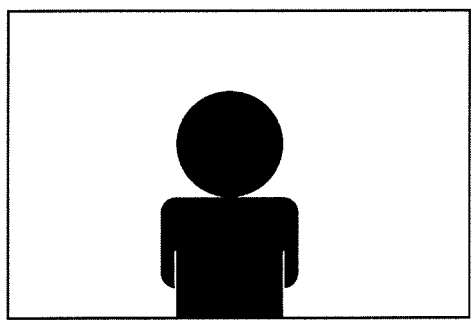
FIG. 8B is a view exemplifying a moving object region detection result.

A moving object region detection unit 1060 detects a moving object region using the underexposed image, and the correctly exposed or overexposed image having undergone alignment (steps S5A and S5B). FIG. 7 shows the configuration of the moving object region detection unit 1060. Referring to FIG. 7, a reference image 1061 is an underexposed image, which shows a scene shown in FIG. 8A. On the other hand, an aligned image 1062 is a correctly exposed or overexposed image having undergone alignment, which shows a scene shown in FIG. 8B where an object has slightly moved to the right, as compared with FIG. 8A. A moving object detection unit 1063 detects a moving object region from the reference image 1061 and aligned image 1062. There may be several methods of extracting a moving object region. However, complicated processing is not practical because of the limited memory capacity and processing speed of a camera.

In this embodiment, the luminance difference or color difference between two images is obtained, and a region having a difference is determined as a moving object. Irrespective of which difference is used, in a scene where the color of the object is similar to the background color, even though the object has moved, it may be erroneously detected that the object has not moved, and a region having a difference may partially appear on the moving object. Such erroneously detected region is not processed as a moving object region, and thus the color, luminance, and noise are different from those in a surrounding region, resulting in a composite image which looks very unnatural. To solve this problem, in this embodiment, a highlight-/shadow-detail loss region removing unit 1064, an isolated region removing unit 1065, and the like remove an erroneously detected region from a difference Diff as much as possible. Furthermore, the region is replaced by a weighted addition multiple image, instead of one exposed image. The difference Diff is calculated using color signals and luminance signals according to equation (2).

$$\text{Diff} = \sqrt{(Y_{base} - Y_{oth})^2 + (U_{base} - U_{oth})^2 + (V_{base} - V_{oth})^2} \quad (2)$$

where Y represents the luminance signal, and U and V represent the color signals. The difference Diff, therefore, indicates a color difference.

Figure 8C:
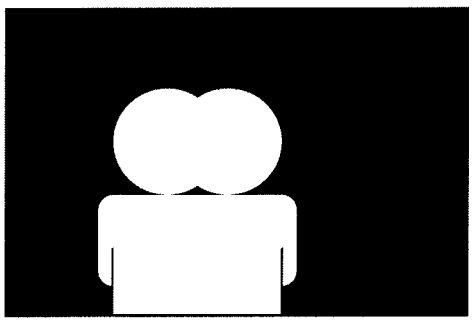
FIG. 8C is a view exemplifying a moving object region detection result.

The highlight-/shadow-detail loss region removing unit 1064 removes, from the difference Diff, the shadow-detail loss luminance regions of the underexposed and correctly exposed images, and the highlight-detail loss luminance regions of the correctly exposed and overexposed images. This operation is performed to prevent a problem that highlight- or shadow-detail loss region appears as a difference in the detection result of the moving object detection unit 1063 and is erroneously determined as a moving object region. A region of a signal having a luminance equal to or smaller than a shadow-detail loss luminance th1 of the reference image 1061 and a region of a signal having a luminance equal to or larger than a highlight-detail loss luminance th2 of the aligned image 1062 are removed from the difference Diff (the signal values are set to 0). The result is as shown in FIG. 8C.

Figure 8D:
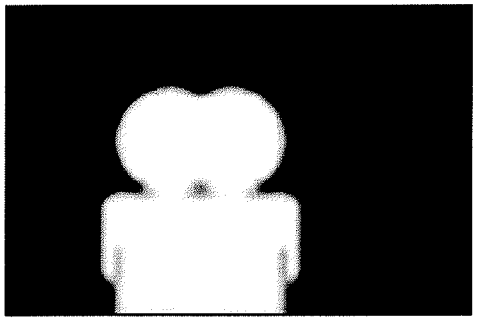
FIG. 8D is a view exemplifying a moving object region detection result.

After that, the process advances to processing of correcting the moving object region with reference to the resultant difference Diff. Before the processing, however, the isolated region removing unit 1065 removes, based on the difference Diff, erroneously detected isolated regions such as a minute moving object and a non-moving object in a moving object. This makes it possible to smoothly and naturally render the boundaries of the moving object region. There may be several methods of removing isolated regions. For example, reduction and enlargement of the difference Diff will be exemplified. In reduction, it is possible to remove a small region erroneously determined as a moving object. In enlargement to the original size, a non-moving object region existing in a moving object region can be reduced. As another method, isolated regions are removed by filter processing using surrounding pixels at high accuracy. However, since reduction/enlargement imposes a low processing load, it is an effective means for processing in the camera with the limited resources. FIG. 8D shows a moving object region extracted by the above moving object region detection processing. The image signal of a non-moving object region is represented by 0 and that of a moving object region is represented by 255 (for 8 bits). A value from 1 to 254 represents the boundaries between the moving object region and the non-moving object region.

Figure 9:
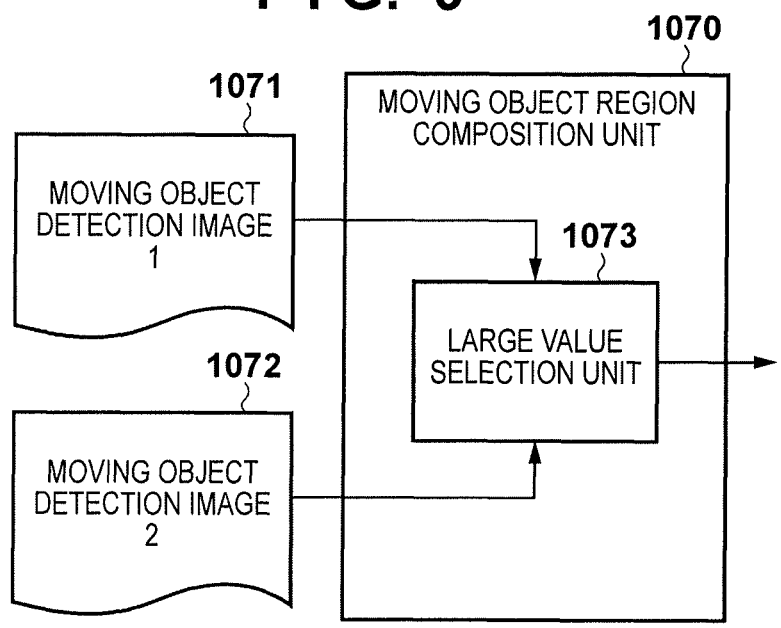
FIG. 9 is a block diagram showing the configuration of a moving object region composition unit according to the embodiment.

A moving object region composition unit 1070 composes the moving object region of the underexposed and correctly exposed images with that of the underexposed and overexposed images, which are output from the moving object region detection unit 1060 (step S6). FIG. 9 shows the configuration of the moving object region composition unit 1070. Referring to FIG. 9, a large value selection unit 1073 selects large values in moving object detection image 1 (1071) of the underexposed and correctly exposed images, and moving object detection image 2 (1072) of the underexposed and overexposed images. Since the moving object region is represented by a signal of 1 or larger, large values are selected to obtain an image where all moving object regions have been detected.

Figure 10:
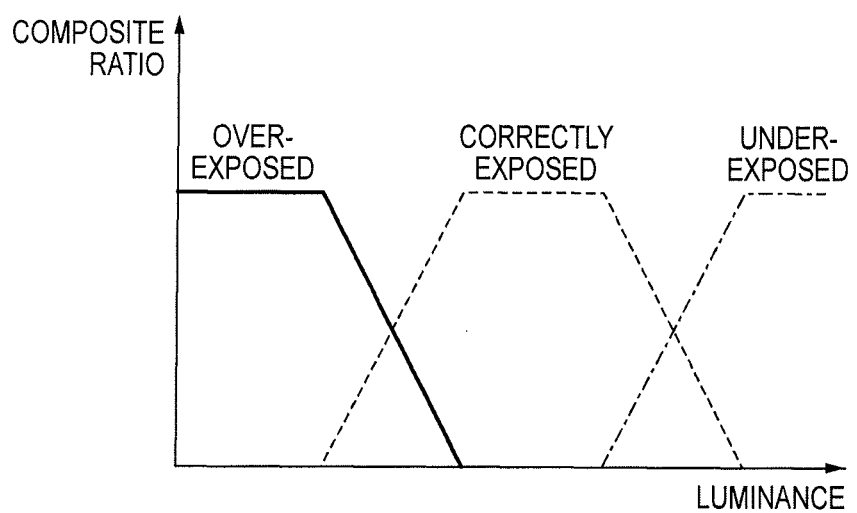
FIG. 10 is a graph showing HDR composite ratios.

On the other hand, an image composition unit 1080 separately performs luminance-specific composition processing according to composite ratios shown in FIG. 10 using the underexposed image and the correctly exposed and overexposed images having undergone alignment, thereby generating an HDR composite image (step S7). To obtain an HDR composite image, the overexposed image is used for a region darker than a composition reference luminance threshold Y1, the correctly exposed image is used for a region having a luminance value between composition reference luminance thresholds Y2 and Y3, and the underexposed image is used for a region brighter than a composition reference luminance threshold Y4. In intermediate regions near the boundaries between the composition reference luminance thresholds Y1 and Y2 and between the composition reference luminance thresholds Y3 and Y4, the composite ratios are gradually changed to smoothly switch the images.

Lastly, a moving object processing unit 1090 modifies the moving object region in the HDR composite image with reference to the moving object region detection image (step S8). As described above, it is difficult to perform processing of correctly extracting a moving object region and replacing it by only the underexposed image in the camera with the limited resources. To solve this problem, the moving object region is replaced by an image obtained by performing weighted addition of the underexposed, correctly exposed, and overexposed images. Basically, the underexposed image including a smallest degree of highlight-detail losses is preferentially used but the correctly exposed and overexposed images are mixed at a small ratio according to the degree of image quality degradation such as color bending and noise of the image. The shooting exposure widths of the underexposed and overexposed images in the high dynamic range are considered. The quality of the underexposed image depends on the magnitude of the gain multiplied in the image processing. In HDR composition, for example, if there are user setting options such as a narrow shooting exposure width (±1 EV), standard shooting exposure width (±2 EV), and wide shooting exposure width (±3 EV), a gain multiplied for underexposure with a wide width (−3 EV) is larger than that for underexposure with a narrow width (−1 EV). Color bending and noise are, therefore, larger for underexposure with a wide width. A final image signal S of the moving object region is calculated by:

$$S = \alpha \text{Low} + \beta \text{Mid} + \gamma \text{Hi}$$

$$\alpha + \beta + \gamma = 1$$

The weighted addition ratios of underexposed (Low), correctly exposed (Mid) and overexposed (Hi) images are as follows.

|  | underexposed image α | correctly exposed image β | overexposed image γ |
| --- | --- | --- | --- |
| ±1 EV | 70% | 20% | 10% |
| ±2 EV | 50% | 30% | 20% |
| ±3 EV | 20% | 30% | 50% |

Figure 11A:
FIG. 11A is a view exemplifying the result of the HDR composition processing according to the embodiment.
Figure 11B:
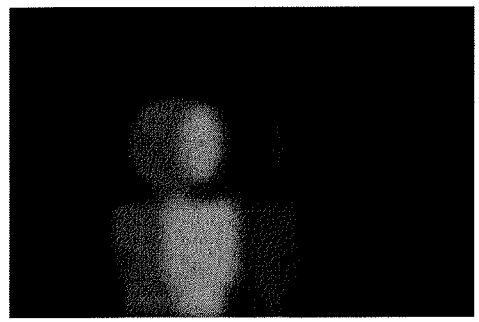
FIG. 11B is a view exemplifying the result of the HDR composition processing according to the embodiment.
Figure 11C:
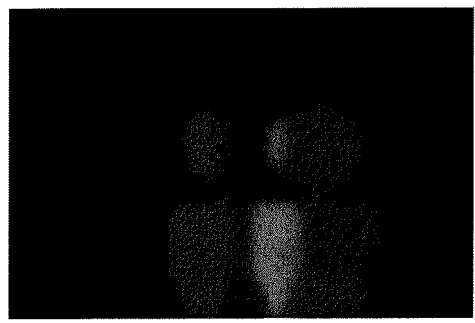
FIG. 11C is a view exemplifying the result of the HDR composition processing according to the embodiment.

Each of FIGS. 11A to 11C shows an example of rendering of a moving object corresponding to the above shooting exposure width setting. FIG. 11A corresponds to ±1 EV, FIG. 11B corresponds to ±2 EV, and FIG. 11C corresponds to ±3 EV. Note that the control unit 1210 obtains user setting information from the I/F unit 1200 shown in FIG. 1.

In the above-described first embodiment, since a moving object region is replaced by a multiple image obtained by performing weighted addition of the underexposed, correctly exposed, and overexposed images, instead of one underexposed image, it is possible to obtain a natural image irrespective of the moving object region detection accuracy. Furthermore, it becomes possible to preferentially use the underexposed image with a risk of highlight-detail losses as low as possible by considering the quality of the underexposed image.

In the first embodiment, the underexposed image is used as a reference image for displacement detection or moving object region detection. However, if the detection accuracy becomes more appropriate by using the correctly exposed or overexposed image as a reference image, the correctly exposed or overexposed image may be used as a reference image. Similarly, although the underexposed image is used as a composition reference image, the correctly exposed or overexposed image may be used as a composition reference image according to the quality of the HDR composite image.

Second Embodiment

In the above-described first embodiment, the weighted addition ratios of the underexposed, correctly exposed, and overexposed images are determined based on the shooting exposure width as a user setting item in HDR composition. To the contrary, in the second embodiment, the weighted addition ratios of underexposed, correctly exposed, and overexposed images are determined based on a correct ISO sensitivity.

Note that the configuration of an image capturing apparatus according to the second embodiment is the same as that shown in FIG. 1, and a description thereof will be omitted. A difference from the first embodiment will be described. A moving object processing unit 1090 according to the second embodiment is different from that in the first embodiment.

A scene to undergo HDR composition is not limited to a scene with backlight during the daytime, and may include a dark scene with neon lights in a night view. In a dark scene, the ISO sensitivity in shooting needs to be increased, and the amount of noise in each of the underexposed, correctly exposed, and overexposed images also increases. A noise reduction unit 1012 shown in FIG. 2 performs appropriate noise reduction processing for the noise, which is, however, insufficient for the high ISO sensitivity. Hence, the weighted addition ratios of the underexposed, correctly exposed, and overexposed images are determined based on the ISO sensitivity, as shown in the following table.

|  | underexposed image α | correctly exposed image β | overexposed image γ |
| --- | --- | --- | --- |
| low ISO sensitivity | 70% | 20% | 10% |
| middle ISO sensitivity | 50% | 30% | 20% |
| high ISO sensitivity | 20% | 30% | 50% |

In the aforementioned second embodiment, since the weighted addition ratios of the underexposed, correctly exposed, and overexposed images forming the moving object region are determined based on the ISO sensitivity, degradation in quality of the underexposed image is unnoticeable even if the ISO sensitivity becomes high. Note that ISO sensitivity information is stored as information in a shooting operation in a memory unit 1220 immediately after the shooting operation, and is read out by a control unit 1210.

Third Embodiment

In the above-described first embodiment, the weighted addition ratios of the underexposed, correctly exposed, and overexposed images are determined based on the shooting exposure width setting as a user setting item in HDR composition. In the above-described second embodiment, the weighted addition ratios of the underexposed, correctly exposed, and overexposed images are determined based on the correct ISO sensitivity. To the contrary, in this embodiment, the weighted addition ratios of underexposed, correctly exposed, and overexposed images are determined based on a moving object representation method as a user setting item in HDR composition.

Note that the configuration of an image capturing apparatus according to the third embodiment is the same as that shown in FIG. 1, and a description thereof will be omitted. A difference from the first and second embodiments will be described. A moving object processing unit 1090 according to the third embodiment is different from that in the first and second embodiments.

Figure 12A:
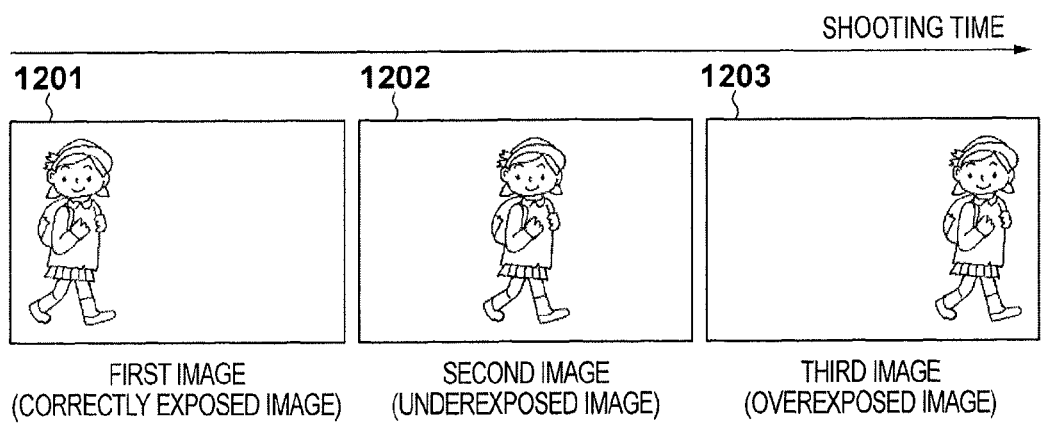
FIG. 12A is a view for explaining moving object representation method selection processing according to the third embodiment.

A moving object representation method as a user setting item according to the embodiment will be described with reference to FIGS. 12A to 12F. In FIG. 12A, reference numerals 1201, 1202, and 1203 denote a first image (correctly exposed image), second image (underexposed image), and third image (overexposed image) obtained by sequentially shooting a moving object, respectively. Each of FIGS. 12B to 12F exemplifies a moving object representation method realized by changing the weighted addition ratios of the underexposed, correctly exposed, and overexposed images.

Figure 12B:
FIG. 12B is a view for explaining moving object representation method selection processing according to the third embodiment.
Figure 12C:
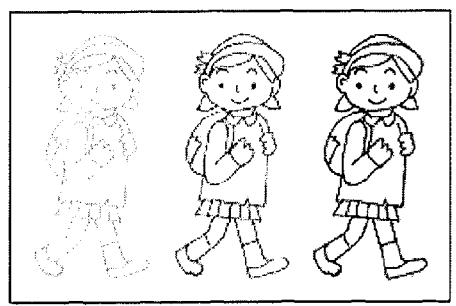
FIG. 12C is a view for explaining moving object representation method selection processing according to the third embodiment.
Figure 12D:
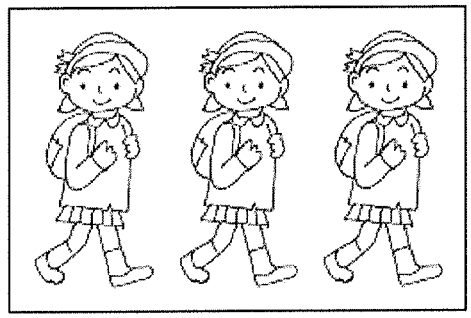
FIG. 12D is a view for explaining moving object representation method selection processing according to the third embodiment.
Figure 12E:
FIG. 12E is a view for explaining moving object representation method selection processing according to the third embodiment.
Figure 12F:
FIG. 12F is a view for explaining moving object representation method selection processing according to the third embodiment.

In this embodiment, a representation method, as shown in FIG. 12B, in which a flash is turned on with front-curtain sync during long exposure and a moving object is shot most clearly at the start of shooting (the first image with an earliest shooting time) will be referred to as a front-curtain sync mode. A representation method, as shown in FIG. 12C, in which a flash is turned on with rear-curtain sync during long exposure and a moving object is shot most clearly at the end of shooting (the third image with a latest shooting time) will be referred to as a rear-curtain sync mode. A representation method, as shown in FIG. 12D, in which a flash is turned on multiple times during long exposure and a moving object is equally shot at any time during shooting (the first to third images) will be referred to as multiple flash mode A. A representation method, as shown in FIG. 12E, in which a moving object is shot most clearly at the middle point (the second image) during shooting will be referred to as multiple flash mode B. A representation method, as shown in FIG. 12F, in which a moving object is shot only at the middle point (the second image) during shooting will be referred to as blur reduction. By allowing the user to select a desired one of those moving object representation methods based on feature information such as the size, moving speed, and moving direction of the moving object, the user can have a wider variety of moving object representation methods.

The weighted addition ratios of the underexposed, correctly exposed, and overexposed images are determined based on the moving object representation method selected by the user, as shown in the following table.

|  | underexposed image α | correctly exposed image β | overexposed image γ |
|---|---|---|---|
| front-curtain sync mode | 70% | 20% | 10% |
| rear-curtain sync mode | 10% | 20% | 70% |
| multiple flash mode A | 33% | 34% | 33% |
| multiple flash mode B | 10% | 80% | 10% |
| blur reduction | 0% | 100% | 0% |

Note that the moving object representation method is not limited to the above-described five methods, and some variations are possible by changing the weighted addition ratios of the underexposed, correctly exposed, and overexposed images.

In the above-described third embodiment, the weighted addition ratios of the underexposed, correctly exposed, and overexposed images forming the moving object region are determined based on the moving object representation method as a user setting item in HDR composition. It is, therefore, possible to reflect the moving object representation method selected by the user on an HDR composite image. Note that an I/F unit 1200 accepts a selection operation by the user, and a control unit 1210 obtains user setting information. The user setting information may be obtained before shooting or when the user inputs the information while checking the HDR composite image after shooting.

FIG. 13 exemplifies a UI screen used by the user to select a moving object representation method according to the embodiment. The control unit 1210 displays the UI screen on a display unit or the like via the I/F unit 1200. Note that as shown in FIG. 13, the UI screen may be configured to enable the user to select whether to perform displacement correction in a displacement correction unit 1050 and whether to compose moving object regions in a moving object region composition unit 1070, in addition to selection of a moving object representation method.

Fourth Embodiment

In the above-described third embodiment, the weighted addition ratios of the underexposed, correctly exposed, and overexposed images are determined based on the moving object representation method as a user setting item. To the contrary, in this embodiment, a control unit 1210 automatically sets a moving object representation method based on feature information of a moving object.

Note that the configuration of an image capturing apparatus according to the fourth embodiment is the same as that shown in FIG. 1, and a description thereof will be omitted. A difference from the third embodiment will be described.

Figure 14:
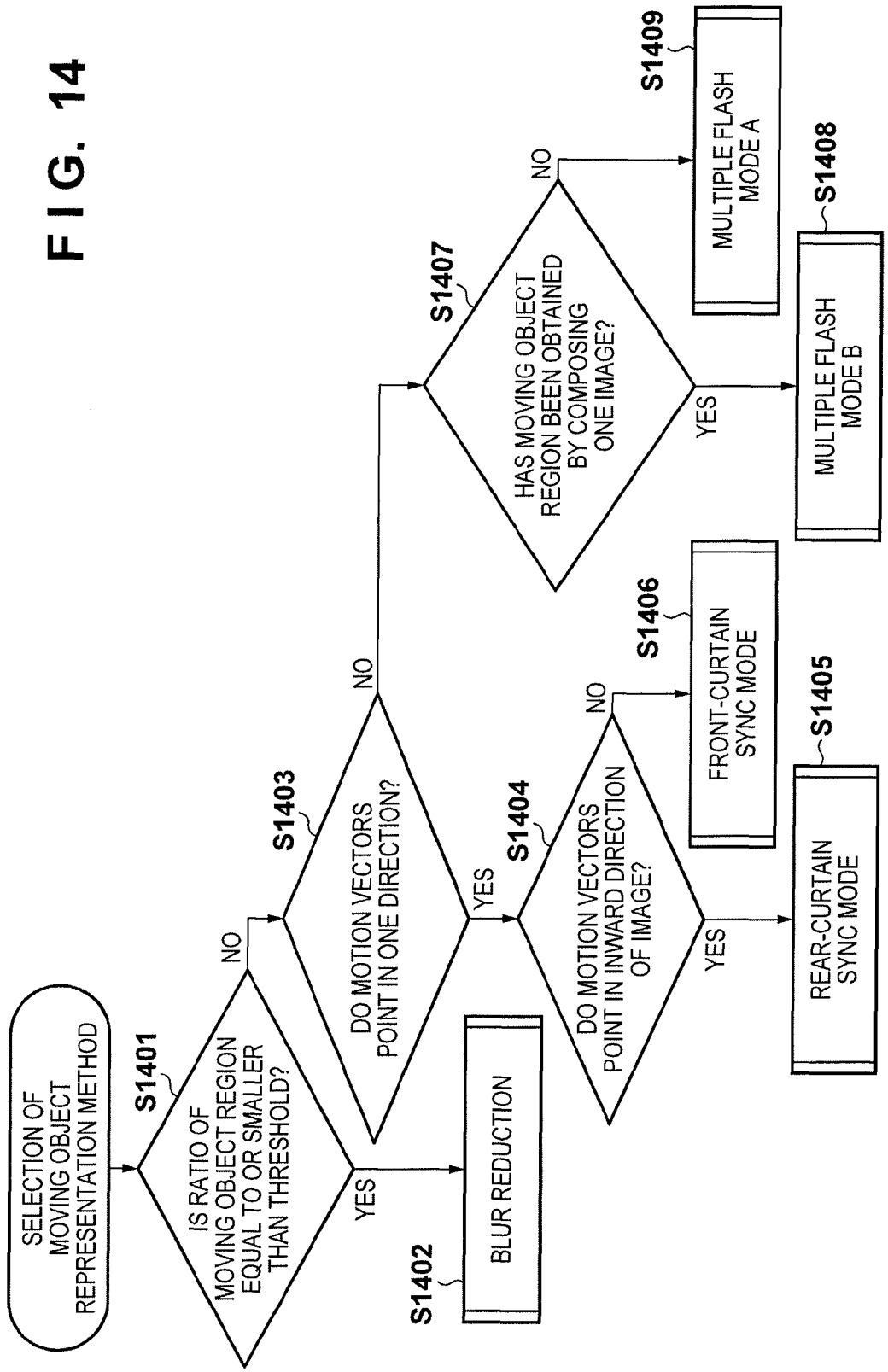
FIG. 14 is a flowchart illustrating moving object representation method selection processing according to the fourth embodiment.

FIG. 14 shows processing of automatically setting a moving object representation method based on feature information of a moving object according to the embodiment. The processing is implemented when the control unit 1210 expands, on the work area of a RAM or the like, a program stored in a memory unit 1220, and executes it.

Referring to FIG. 14, if a moving object region detection unit 1060 determines that the ratio of a moving object region to an image is equal to or smaller than a threshold, for example, 5% (YES in step S1401), essentially no moving object is included, and thus the control unit 1210 selects blur reduction shown in FIG. 12F (steps S1401 and S1402).

If the ratio of the moving object region to the image is larger than the threshold (NO in step S1401), a displacement detection unit 1040 can obtain an optical flow based on the motion vectors of the moving object, and all the motion vectors in three images point in one outward direction of the image (YES in step S1403 and NO in step S1404), a representation in which the moving object gradually disappears is appropriate, and thus the control unit 1210 selects, as a moving object representation method, a front-curtain sync mode shown in FIG. 12B (step S1406).

On the other hand, if the displacement detection unit 1040 can obtain an optical flow based on the motion vectors of the moving object, and all the motion vectors in the three images point in one inward direction of the image (YES in step S1404), a representation in which the moving object gradually appears is appropriate, and thus the control unit 1210 selects, as a moving object representation method, a rear-curtain sync mode shown in FIG. 12C (step S1405).

If the displacement detection unit 1040 can obtain an optical flow based on the motion vectors of the moving object, and the motion vectors in the three images all point in different directions (NO in step S1403), a flowing representation is not appropriate as a moving object representation method. Therefore, based on the number of moving object region images composed by an image composition unit 1080, the control unit 1210 selects a moving object representation method. If a plurality of images have been composed (NO in step S1407), the control unit 1210 selects multiple flash mode A shown in FIG. 12D (step S1409). Alternatively, if one image has been composed (YES in step S1407), the control unit 1210 selects multiple flash mode B shown in FIG. 12E (step S1408).

In order to use the effect of HDR composition by detecting, by the image composition unit 1080, an image with a largest composite ratio of the moving object region among the three images, the control unit 1210 may select multiple flash mode B shown in FIG. 12E in which the weighted addition ratio of the image with a largest composite ratio has been increased.

By assuming the target user of the image capturing apparatus, conditions under which a moving object representation method is selected, such as the moving speed of the moving object and the position of the moving object on the image, may be added to the aforementioned conditions, or the aforementioned conditions may be selected.

Fifth Embodiment

In the above-described third embodiment, the weighted addition ratios of the underexposed, correctly exposed, and overexposed images are determined based on the moving object representation method as a user setting item in DHR composition. To the contrary, in the embodiment, a control unit 1210 automatically sets the shooting order based on a set moving object representation method.

When reflecting a moving object representation method, a more natural representation can be obtained by considering feature information of first, second, and third images sequentially shot. The shooting order of the underexposed, correctly exposed, and overexposed images is determined based on the moving object representation method selected by the user, as shown in the following table.

|  | first image | second image | third image |
|---|---|---|---|
| front-curtain sync mode | underexposed image | correctly exposed image | overexposed image |
| rear-curtain sync mode | overexposed image | correctly exposed image | underexposed image |

The practical relationship between the moving object representation and the shooting order will be described below.

If the front-curtain sync mode shown in FIG. 12B is selected as a moving object representation method, a first image (underexposed image), a second image (correctly exposed image), and a third image (overexposed image) are shot by sequentially shooting a moving object, unlike the third embodiment. This is because the first image includes a clear moving object due to a short exposure time, and the third image includes a moving object leaving a trail due to a long exposure time, and they are therefore appropriate for the front-curtain sync mode shown in FIG. 12B.

If the rear-curtain sync mode shown in FIG. 12C is selected as a moving object representation method, a first image (overexposed image), a second image (correctly exposed image), and a third image (underexposed image) are shot by sequentially shooting a moving object, unlike the third embodiment. This is because the first image includes a moving object leaving a trail due to a long exposure time, and the third image includes a clear moving object due to a short exposure time, and they are therefore appropriate for the rear-curtain sync mode shown in FIG. 12C.

By assuming the target user of an image capturing apparatus, conditions under which the shooting order is determined based on the moving object representation method may be added to the aforementioned conditions or the aforementioned conditions may be selected.

Sixth Embodiment

The image used by the moving object processing unit 1090 to replace the moving object region was the image obtained by performing weighted addition of the underexposed, correctly exposed, and overexposed images at the ratios in the above-described first to third embodiments.

If a portion corresponding to the background of the moving object region is a high- or low-luminance region, the effect of high dynamic range composition may reduce when the moving object processing unit 1090 modifies the region with a weighted addition image. That is, if the background of the moving object region is a high-luminance region, weighted addition of the overexposed image including a highlight-detail loss reduces the effect of high dynamic range composition. Alternatively, if the background of the moving object region is a low-luminance region, weighted addition of the underexposed image including a shadow-detail loss reduces the effect of high dynamic range composition.

Figure 15:
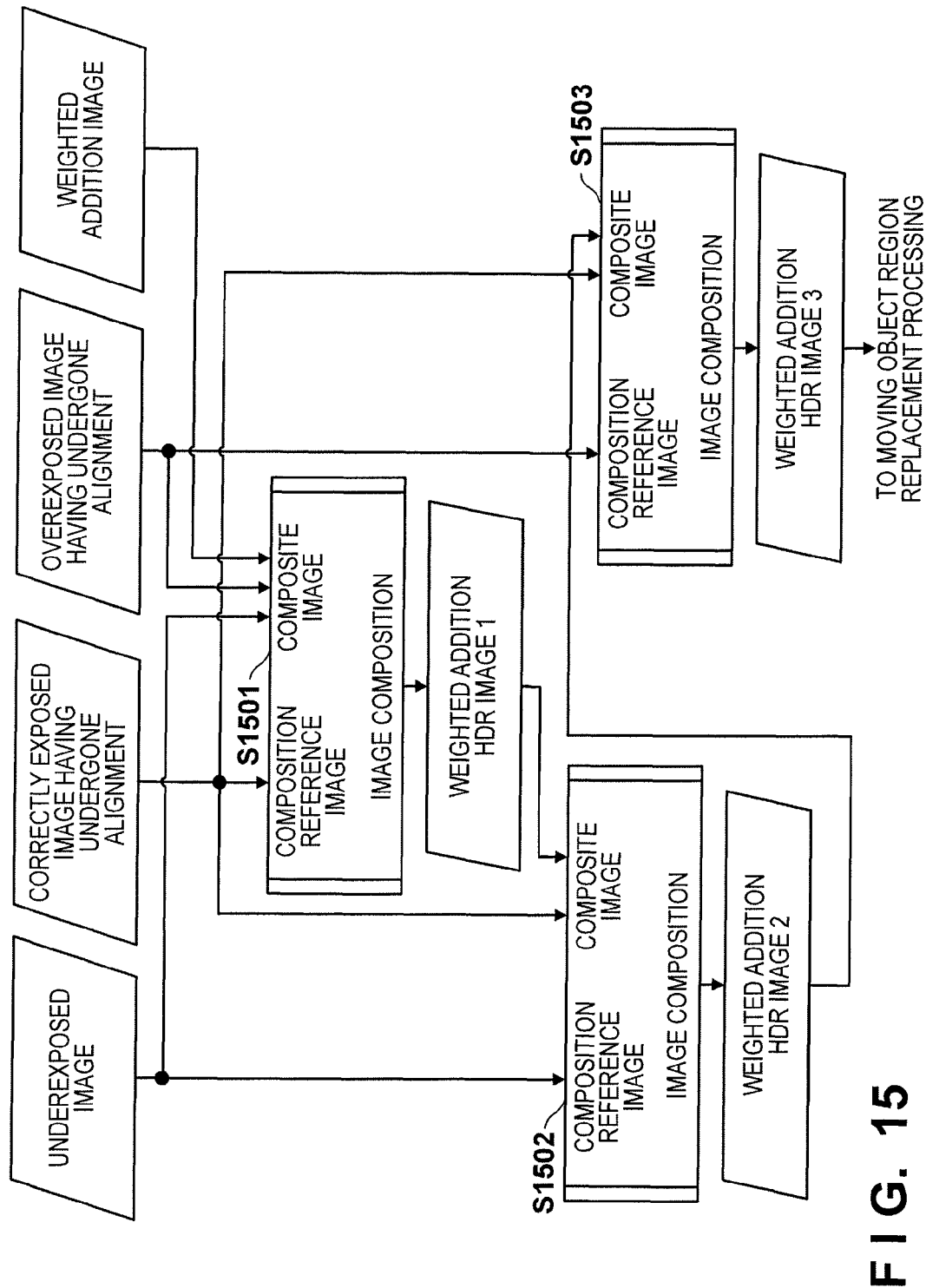
FIG. 15 is a view exemplifying an image composition order in a moving object processing unit according to the sixth embodiment.

To the contrary, in this embodiment, a method of reducing highlight- and shadow-detail losses even in an image replacing a moving object region by further replacing, by an underexposed image, a high-luminance region of the image obtained by performing weighted addition at the above-described ratios, and replacing a low-luminance region of this image by an overexposed image will be described. An image used to replace the moving object region is generated according to the image composition order shown in FIG. 15.

Figure 16:
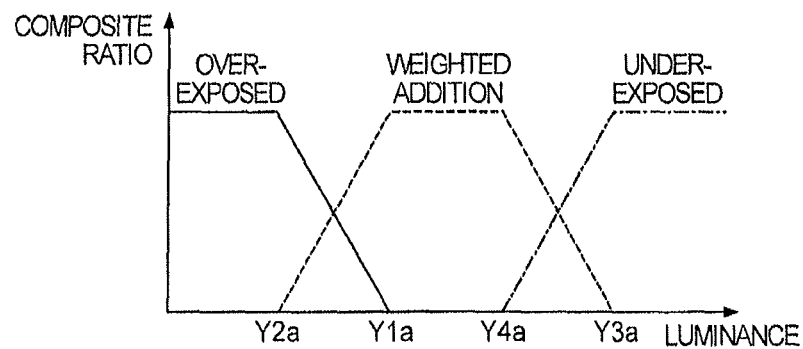
FIG. 16 is a graph showing composite ratios for weighted addition HDR 1.

To maintain the effect of high dynamic range composition, even an image replacing the moving object region undergoes the same processing as that by an image composition unit 1080 according to composite ratios shown in FIG. 16 using a correctly exposed image having undergone alignment as a composition reference image (step S1501). That is, an overexposed image is used for a region darker than a composition reference luminance threshold Y1a, a weighted addition image is used for a region having a luminance value between composition reference luminance thresholds Y2a and Y3a, and an underexposed image is used for a region brighter than a composition reference luminance threshold Y4a. In intermediate regions near the boundaries between the composition reference luminance thresholds Y1a and Y2a and between the composition reference luminance thresholds Y3a and Y4a, the composite ratios are gradually changed to smoothly switch the images. This composite image will be referred to as weighted addition HDR image 1 hereinafter.

Figure 17:
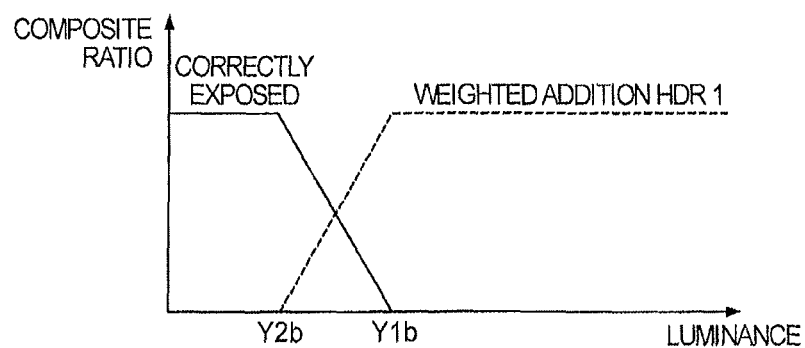
FIG. 17 is a graph showing composite ratios for weighted addition HDR 2.

To reduce shadow-detail losses in weighted addition HDR image 1, the image undergoes the same processing as that by the image composition unit 1080 according to composite ratios shown in FIG. 17 using the underexposed image as a composition reference image (step S1502). That is, the correctly exposed image is used for a region darker than a composition reference luminance threshold Y1b, and weighted addition HDR image 1 is used for a region brighter than a composition reference luminance threshold Y2b. In an intermediate region near the boundary between the composition reference luminance thresholds Y1b and Y2b, the composite ratios are gradually changed to smoothly switch the images. This composite image will be referred to as weighted addition HDR image 2 hereinafter. This processing can reduce shadow-detail losses if a moving object having a low luminance passes through a portion corresponding to a high-luminance region in the correctly exposed image when the underexposed image is shot.

Figure 18:
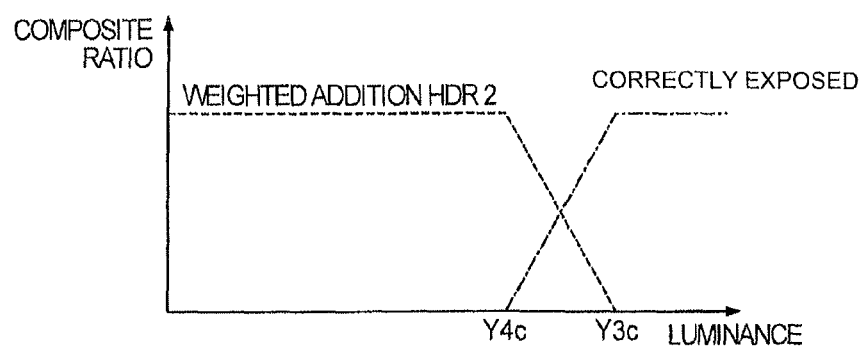
FIG. 18 is a graph showing composite ratios for weighted addition HDR 3.

Furthermore, to reduce highlight-detail losses in weighted addition HDR image 2, the image undergoes the same processing as that by the image composition unit 1080 according to composite ratios shown in FIG. 18 using the overexposed image as a composition reference image (step S1503). That is, weighted addition HDR image 2 is used for a region darker than a composition reference luminance threshold Y3c, and the correctly exposed image is used for a region brighter than a composition reference luminance threshold Y4c. In an intermediate region near the boundary between the composition reference luminance thresholds Y3c and Y4c, the composite ratios are gradually changed to smoothly switch the images. This composite image will be referred to as weighted addition HDR image 3 hereinafter. This processing can reduce highlight-detail losses if a moving object having a high luminance passes through a portion corresponding to a low-luminance region in the correctly exposed image when the overexposed image is shot.

A moving object processing unit 1090 replaces the moving object region by weighted addition HDR image 3.

In the above sixth embodiment, the high-luminance region of the image obtained by performing weighted addition at the ratios described in the first to third embodiments is replaced by the underexposed image, and the low-luminance region of this image is replaced by the overexposed image. It is, therefore, possible to reduce highlight- and shadow-detail losses even in the image replacing the moving object region, thereby maintaining the effect of high dynamic range composition. Note that weighted addition HDR image 2 or weighted addition HDR image 1 may be used as an image replacing the moving object region, instead of weighted addition HDR image 3. In this case, the memory capacity and processing time can be decreased.

Other Embodiments

The present invention is realized by executing the following processing. That is, the present invention is realized by supplying software (a program) which implements the functions of the aforementioned embodiments to a system or apparatus via a network or various storage media, and reading out and executing program codes by the computer (or CPU or MPU) of the system or apparatus. In this case, the program and the storage medium which stores the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-096039, filed Apr. 19, 2012 and 2012-203544, filed Sep. 14, 2012, which are hereby incorporated by reference herein in their entirety.

What is claimed is:

1. An image processing apparatus which composes a plurality of images captured while changing an exposure amount, comprising:
   a CPU implementing the functions of a displacement detection unit, a correction unit, a moving object region detection unit, a moving object region composition unit, an image composition unit and a moving object processing unit, wherein:
   the displacement detection unit is configured to detect a displacement amount between the plurality of images;
   the correction unit is configured to correct a displacement between the images based on the displacement amount detected by the displacement detection unit;
   the moving object region detection unit is configured to detect a moving object region from the plurality of images for which the displacement has been corrected;
   the moving object region composition unit is configured to compose a detection result of an underexposed image and a correctly exposed image with a detection result of the underexposed image and an overexposed image;
   the image composition unit j configured to compose the plurality of images for which the displacement has been corrected to generate a composite image; and
   the moving object processing unit is configured to replace a region corresponding to the moving object region of the composite image with an image obtained by performing weighted addition of the plurality of images.

2. The apparatus according to claim 1, wherein the image composition unit determines addition ratios of the respective images based on a luminance of an image with a smallest exposure amount among the plurality of images.

3. The apparatus according to claim 1, wherein the moving object processing unit determines the addition ratios of the plurality of images based on setting of a shooting exposure width.

4. The apparatus according to claim 1, wherein the moving object processing unit determines the addition ratios of the plurality of images based on a correct ISO sensitivity.

5. The apparatus according to claim 1, further comprising
   a development processing unit configured to perform gamma conversion to equalize luminance levels of the plurality of images,
   wherein the development processing unit determines a gamma characteristic of gamma conversion performed for the plurality of images based on an exposure amount ratio of the plurality of images.

6. The apparatus according to claim 5, wherein the development processing unit sets parameters of noise reduction processing according to the gamma characteristic.

7. The apparatus according to claim 1, wherein the moving object region detection unit detects, as a moving object region, a difference in image signal between a reference image and an aligned image.

8. The apparatus according to claim 1, wherein the moving object region detection unit removes, from the detection result of the moving object region, a luminance region subject to a highlight-detail loss and a luminance region subject to a shadow-detail loss.

9. The apparatus according to claim 8, wherein the moving object region detection unit removes an isolated region from an image in which the moving object has been detected.

10. The apparatus according to claim 1, further comprising
    an image capturing unit configured to capture a plurality of images at a predetermined exposure amount.

11. The apparatus according to claim 1, further comprising
    a selection unit configured to select a moving object region representation method when said moving object processing unit composes the plurality of images,
    wherein based on the representation method selected by said selection unit, said moving object processing unit determines the addition ratios of the plurality of images to generate a weighted addition image.

12. The apparatus according to claim 1, wherein the moving object processing unit generates a weighted addition image by increasing the addition ratio of an image with a later shooting time among the plurality of images.

13. The apparatus according to claim 1, wherein the moving object processing unit generates a weighted addition image by increasing the addition ratio of an image with an earlier shooting time among the plurality of images.

14. The apparatus according to claim 1, wherein the moving object processing unit generates a weighted addition image by equalizing the addition ratios of the plurality of images.

15. The apparatus according to claim 1, wherein the moving object processing unit generates a weighted addition image by maximizing the addition ratio of an image with an intermediate shooting time among the plurality of images.

16. The apparatus according to claim 1, wherein the moving object processing unit determines addition ratios of an underexposed image, an overexposed image, and the weighted addition image based on a luminance of a correctly exposed image.

17. The apparatus according to claim 1, wherein the moving object processing unit determines addition ratios of a correctly exposed image and the weighted addition image based on a luminance of an underexposed image.

18. The apparatus according to claim 1, wherein the moving object processing unit determines addition ratios of a correctly exposed image and the weighted addition image based on a luminance of an overexposed image.

19. The apparatus according to claim 1, further comprising
an operation unit configured to accept a user operation for selecting the representation method.

20. The apparatus according to claim 1, further comprising
an operation unit configured to accept a user operation for selecting whether to correct the displacement by the correction unit.

21. The apparatus according to claim 1, further comprising
an operation unit configured to accept a user operation for selecting whether to process the moving object region by the moving object processing unit.

22. The apparatus according to claim 1, wherein the selection unit automatically selects the representation method based on feature information of the moving object region.

23. The apparatus according to claim 22, wherein the feature information includes one of a ratio of the moving object region to the image, a motion vector detected from the moving object region, and information indicating whether the moving object region is obtained by composing the plurality of images.

24. The apparatus according to claim 1, further comprising
an image capturing unit configured to capture a plurality of images at a predetermined exposure amount, and
a control unit configured to control an image shooting order by the image capturing unit based on the representation method set by the selection unit.

25. an image processing apparatus which composes a plurality of images captured while changing an exposure amount, comprising:
a CPU implementing the functions of a displacement detection unit, a correction unit, a moving object region detection unit, an image composition unit and a moving object processing unit, wherein:
the displacement detection unit is configured to detect a displacement amount between the plurality of images;
the correction unit is configured to correct a displacement between the images based on the displacement amount detected by the displacement detection unit;
the moving object region detection unit is configured to detect a moving object region from the plurality of images for which the displacement has been corrected, wherein the moving object region detection unit detects a first moving object region for an object by comparing an underexposed image with a correctly exposed image, and a second moving object region for the same object by comparing an underexposed image with an overexposed image;
the image composition unit is configured to compose the plurality of images for which the displacement has been corrected to generate a composite image; and
the moving object processing unit is configured to replace a region corresponding to the first moving object region and the second moving object region of the composite image with an image obtained by performing weighted addition of the plurality of images.

26. The apparatus according to claim 25, wherein the image composition unit determines addition ratios of the respective images based on a luminance of an image with a smallest exposure amount among the plurality of images.

27. The apparatus according to claim 25, wherein the moving object processing unit determines the addition ratios of the plurality of images based on setting of a shooting exposure width.

28. The apparatus according to claim 25, wherein the moving object processing unit determines the addition ratios of the plurality of images based on a correct ISO sensitivity.

29. The apparatus according to claim 25, further comprising
a development processing unit configured to perform gamma conversion to equalize luminance levels of the plurality of images,
wherein the development processing unit determines a gamma characteristic of gamma conversion performed for the plurality of images based on an exposure amount ratio of the plurality of images.

30. The apparatus according to claim 29, wherein the development processing unit sets parameters of noise reduction processing according to the gamma characteristic.

31. The apparatus according to claim 25, wherein the moving object region detection unit detects, as a moving object region, a difference in image signal between a reference image and an aligned image.

* * * * *